United States Patent
Hornung (10) Patent No.: US 10,400,856 B2
(45) Date of Patent: Sep. 3, 2019

(54) SELF-ADHESIVE BALANCING WEIGHT FOR A VEHICLE WHEEL

(71) Applicant: Wegmann automotive GmbH & Co. KG, Vietshöchheim (DE)

(72) Inventor: Thomas Hornung, Würzburg (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 15/438,237

(22) Filed: Feb. 21, 2017

(65) Prior Publication Data

US 2017/0159748 A1 Jun. 8, 2017

Related U.S. Application Data

(63) Continuation of application No. PCT/EP2015/068901, filed on Aug. 18, 2015.

(30) Foreign Application Priority Data

Aug. 21, 2014 (EP) .................................... 14181854

(51) Int. Cl.
*F16F 15/32* (2006.01)
*F16F 15/34* (2006.01)

(52) U.S. Cl.
CPC ............ *F16F 15/328* (2013.01); *F16F 15/32* (2013.01); *F16F 15/324* (2013.01); *F16F 15/34* (2013.01)

(58) Field of Classification Search
CPC ........ F16F 15/328; F16F 15/324; F16F 15/36; F16F 15/32; F16F 15/34; B60C 19/003
See application file for complete search history.

(56) References Cited

U.S. PATENT DOCUMENTS

| | | | |
|---|---|---|---|
| 3,336,083 A | | 8/1967 | Chatain et al. |
| 5,564,791 A | * | 10/1996 | Chase ....................... B60B 5/02 301/5.21 |
| 6,364,421 B1 | | 4/2002 | Pursley |
| 2006/0158018 A1 | * | 7/2006 | Francischetti ........ F16F 15/324 301/5.21 |

(Continued)

FOREIGN PATENT DOCUMENTS

| | | |
|---|---|---|
| CN | 1576057 | 2/2005 |
| CN | 101287614 | 10/2008 |

(Continued)

OTHER PUBLICATIONS

International Search Report and Written Opinion in International Application No. PCT/EP2015/068901 dated Oct. 30, 2015.

(Continued)

*Primary Examiner* — Kip T Kotter
*Assistant Examiner* — Scott A Browne
(74) *Attorney, Agent, or Firm* — Norton Rose Fulbright US LLP (57) ABSTRACT

A self-adhesive balancing weight for a vehicle wheel has a top surface and a bottom surface with a self-adhesive tape. The bottom surface has a first curved section with a first radius and a second curved section with a second radius. The first radius is smaller than the second radius. This allows to hold the balancing weight by the adhesive tape to almost every rim, as there are always at least two holding points (-lines) by which the balancing weight contacts the rim via the adhesive tape.

16 Claims, 11 Drawing Sheets

(56) References Cited

U.S. PATENT DOCUMENTS

| | | | | |
|---|---|---|---|---|
| 2007/0108834 A1 | 5/2007 | Fogal | | 301/5.22 |
| 2009/0243370 A1* | 10/2009 | Peniche | | F16F 15/328 |
| | | | | 301/5.21 |
| 2013/0285435 A1* | 10/2013 | McMahon | | F16F 15/324 |
| | | | | 301/5.21 |
| 2016/0369868 A1* | 12/2016 | Belknap | | F16F 15/345 |

FOREIGN PATENT DOCUMENTS

| | | | | |
|---|---|---|---|---|
| CN | 101555925 | | 10/2009 | |
| CN | 102245398 | | 11/2011 | |
| EP | 1128176 A2 | * | 8/2001 | ............ F16F 15/328 |
| EP | 2988018 | | 2/2016 | |
| FR | 1309852 | | 11/1962 | |
| FR | 2909150 A1 | * | 5/2008 | ............ F16F 15/328 |
| GB | 911275 A | * | 11/1962 | ............ F16F 15/324 |
| GB | 915729 A | * | 1/1963 | ............ F16F 15/324 |
| JP | H01-152579 | | 9/1991 | |
| JP | H05-321984 | | 12/1993 | |
| JP | 2002-295592 | | 10/2002 | |
| JP | 2007-255470 | | 10/2007 | |
| WO | WO/99/00609 A1 | | 1/1999 | |
| WO | WO/16/026833 | | 2/2016 | |

OTHER PUBLICATIONS

Extended European Search Report in European Application No. 14181854.2 dated Mar. 10, 2015.
Office action in Japanese Patent Application No. 2017-510571 dated Aug. 28, 2017.
Office Action issued in Chinese Patent Application No. 201580050723. 5, dated May 31, 2018.

* cited by examiner

SELF-ADHESIVE BALANCING WEIGHT FOR A VEHICLE WHEEL

PRIORITY CLAIM

This application is a continuation of pending International Application No. PCT/EP2015/068901 filed on Aug. 18, 2015, which designates the United States and claims priority from European Application No. 14181854.2 filed on Aug. 21, 2014, each of which is incorporated herein by reference in its entirety.

BACKGROUND OF THE INVENTION

1. Field of the Invention

The invention relates to a self-adhesive balancing weight, which may be attached to the rim of a wheel of a vehicle for balancing the wheel.

2. Description of Relevant Art

The contact surface of self-adhesive balancing weights generally is formed so as to accurately fit to the counter surface of the wheel rim holding the weight to provide as much contact surface and thereby adhesive surface area as possible in order to ensure safe fixation. As the rim profiles of different types of wheels—coming from different wheel manufactures for instance—differ in a wide range, a great number of different balancing weights has to be kept on stock. Particularly, the counter-surface of aluminum wheel rims, to which the balancing weights have to be fixed, often are concave-convex shaped so that accurate adaptation of balancing weights is difficult.

WO 99/00609 discloses self-adhesive balancing weights the contact surfaces of which are exactly complementary to the shape of the counter-surface of the respective wheel rim so that they could not be used with wheel rims of different shape.

US 2007/0108834 A1 discloses a balancing weight body filled with mass material particles.

FR 1.309.852 discloses a balancing weight with a curved attachment section.

There is a large number of different rim geometries in the market. Furthermore, there are significant mechanical tolerances in the rims which may be in an order of 1 mm.

For reliably attaching balancing weights to a rim, there are two basic concepts. Self-adhesive balancing weights usually have a planar back surface which is designed to adhere to an at least essentially planar surface which is curved only around the rotational axis of the wheel. Accordingly, the self-adhesive balancing weights have to be bent only in one axis. The second type of balancing weights are clip-on balancing weights which are held to the rim by a spring clip. These balancing weights usually are held in an outer groove of the rim and therefore must at least roughly be adapted to the contour of the groove. Due to the large number of different grooves, at least a significant number of differently formed balancing weights is required.

SUMMARY OF THE INVENTION

The embodiments are based on the object of providing self-adhesive balancing weights which fit to several different rim shapes. Therefore only a small number of balancing weights or only a single type of balancing weights should fit to a broad variety of rims.

For finding a solution of the problem, a large number of rims has been analyzed and checked for possible locations for mounting of balancing weights. A balancing weight which fits to most rims on the market, provides the following features.

A balancing weight has a top surface which basically may have any shape, but preferably is a planar surface. Approximately opposed thereto is a bottom surface which is preferably designed to be held to the rim by means of a self-adhesive tape. The self-adhesive tape preferably is attached to the bottom surface or parts thereof. In an alternate embodiment, the balancing weight may be held to the rim by means of clip. Furthermore it is preferred, if the balancing weight has at least one or two extensions by which the balancing weight may be held by a robot or a person, when the balancing weight is attached to a rim.

The bottom surface, which also serves as an attachment surface has at least two curved sections with different radii. There is a first curved section having a first radius and a second curved section having a second radius. Between the curved sections and the top surface of the balancing weight or the extensions of the balancing weight, there may be an approximately straight or a plurality of straight sections, which preferably have a comparatively large curve radius, significantly larger than the second curved section, or are straight. Although in a preferred embodiment, the first curved section is next to the second curved section, in an alternate embodiment, there may be straight section between the first curved section and the second curved section.

The first curved section has a smaller radius than the second curved section. The first and/or the second curved sections may have notches or recesses for further enhancing fixation to the rim.

Preferably, the first and second curved sections are convex shaped.

It is preferred, if the self-adhesive tape is on the first curved section and on the second curved section. This self-adhesive tape preferably covers the first curved section and the second curved section in a tangential direction. Most preferably the self-adhesive tape completely covers the first curved section and the second curved section in a tangential direction.

There may be one or two further curved sections limiting the bottom surface against the top side. These are different from the first curved section and the second curved section.

Most preferably, the first and second curved sections form at least a contact line with a rim. There is a contact over the length of the balancing weight at these contact points. There may even be a larger contact area if the curvature of the rim is very similar to the curve of the bottom surface of the balancing weight. If there are only small deviations, or a small variations in distance between the rim and the balancing weight, these will be compensated by the adhesive tape. In an embodiment with balancing weights for aluminum rims, there may be at least one contact line or even a contact area with at least one of the straight sections.

Herein the terms contact points and contact lines are used. In a sectional view of the balancing weights, the area of contact between the balancing weight and a rim may look like a point. Actually, there is a projection of the contact point forming a contact line in the direction of the length of the balancing weight. In this document both terms contact point and contact line are used as equivalent as described above.

The both curved sections will result in at least two contact points with the rim of a large variety of balancing weights, which results in a sufficient contact and a sufficient adhesive force to the rim. Due to the curves of the curved sections, the distance to the rim in case of any deviations of the form of the rim is slightly decreasing. Such a slightly decreasing distance may easily be absorbed by a self-adhesive tape between the balancing weight and the rim, thus resulting in a comparatively large section in which adhesive forces apply.

For steel rims, preferably, the radius of the first curved section is about half of the radius of the second curved section. Preferably, the first radius is about 4 mm while the second radius is about 8 mm. These values may be modified in a range of ±50%, preferably within ±30% and most preferably within ±10%.

For aluminum rims, preferably, the radius of the first curved section is about ⅕ of the radius of the second curved section. Preferably, the first radius is about 1.8 mm while the second radius is about 9 mm. These values may be modified in a range of ±50%, preferably within ±30% and most preferably within ±10%. It is further preferred, if there are two straight sections between each of the curved sections and the top surface. Preferably the angle between these straight sections is 90 degrees. The angle may vary for less than ±30 degrees, preferably less than ±20 degrees and most preferably less than ±10 degrees.

Preferably, the center axis for the first radius 40 goes through the balancing weight body, while it is preferred, that the center axis for the second radius 41 is outside of the balancing weight body.

A further embodiment relates to a self-adhesive balancing weight for a vehicle wheel having a top surface and a bottom surface with a self-adhesive tape. The bottom surface comprises a plane which is limited at a first side by a first curved section with a first radius. The self-adhesive tape is limited to the plane and does not cover the first curved section.

The balancing weights may be made from any material as known from the art. The material preferably comprises zinc or steel.

In another embodiment, a connecting means is provided for a flexible connection of a plurality of balancing weights. This connecting means may be a plastic or metal rod or belt or string. It may have only a limited elasticity like a spring or a stiff spring. Reference is made to the European patent application EP 14156871.7 which is included herein by reference. Furthermore, the connecting means may have at least one projection interfacing with a cavity in a balancing weight to improve anchoring of the connecting means within the balancing weight.

In a preferred embodiment, there are gaps or cutouts 18 at at least on side and preferably at both (opposing) sides of the self-adhesive tape, which allow easier bending to adapt to a radius of a rim.

According to another embodiment, a balancing weight has a main body and an extension thereto. Preferably, the main body is roughly prismatic shaped. It is preferred, if the main body has a bottom surface which is also the attachment surface further being an approximately plane surface. At the bottom surface, there is an adhesive tape. The bottom surface has a first bottom edge to the front side of the balancing weight and a second bottom edge to the rear side of the balancing weight. Instead of the edges, there may be curves, preferably with a radius of less than 3 mm. The extension laterally (sideward) extends from the main body and has a basically convex shape and is above the plane of the plane surface and above the first bottom edge. The height above is preferably between 1 and 4 mm. The extension may be defined by a concave curve starting from the first bottom edge and followed by one or two convex curves or radii. There may even be a front plane between the two convex curves. Preferably, there is a smooth transition to the top of the balancing weight which preferably has a convex shape at the rear side to a rear plane which further extends from the second bottom edge.

The combination of an extension together with a balancing weight main body allows easy, quick and convenient applying of a balancing weight to the edge of a rim. In a first step, the balancing weight is moved towards the edge of the rim, such that the extension touches the rim, most preferably at or close to the rim edge inner radius. As there is no adhesive tape at the extension, the rim may be touched without sticking of the balancing weight to the rim. The next step, the balancing weight may be tilted towards the rim, such that the adhesive tape at the bottom surface of the balancing weight contacts the rim. Later, pressure may be applied to the balancing weight to fixedly attached it to the rim.

A further embodiment relates to a chain or a belt of balancing weights comprising a plurality of balancing weights as disclosed in this document. These are interconnected by the self-adhesive tape and/or by a connecting means.

Another embodiment relates to a method for attaching a balancing weight to a rim of a wheel. In a first step, the balancing weight is applied under an angle, which may be between 20 and 90 degrees to the rim, preferably to an edge of the rim. In the next step, the balancing weight is tilted or moved, such that its bottom surface contacts the rim and the self-adhesive tape adheres to the rim. This method can be performed best, if there is no self-adhesive tape at the first curved section. This allows tilting the balancing weight freely without sticking to the rim.

All the embodiments disclosed herein may be combined in any sequence.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
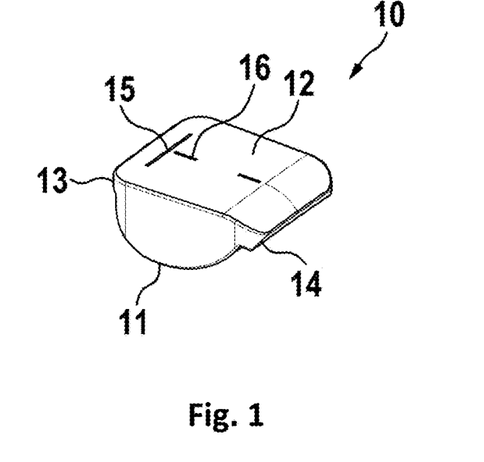
FIG. 1 shows a first embodiment, preferably for steel rims.

In FIG. 1, a first embodiment, preferably for steel rims is shown. A balancing weight 10 has a top surface 12 and a bottom surface 11 opposing to the top surface. The top surface may bear at least one marking and/or an ornamental design. In this embodiment, there is a first line 15 which shows the orientation of the balancing weight and is approximately parallel to the circumference of the rim; a second line 16, which may be under a right angle and comprises of two dashes in this embodiment, is in a radial direction and points towards the axis of the wheel. The bottom surface 11 has a specific contour to be adapted to a large number of different rims, which will be explained later in detail. For holding the balancing weight for an easy assembly to the rim, the balancing weight may have a first extension 13 and/or a second extension 14.

Figure 2:
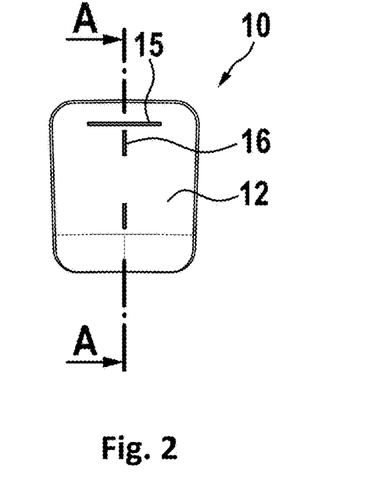
FIG. 2 shows the first embodiment in a top view.

In FIG. 2, the first embodiment is shown in a top view. Here a sectional cut A-A is indicated, which will be shown in detail in the next figure.

Figure 3:
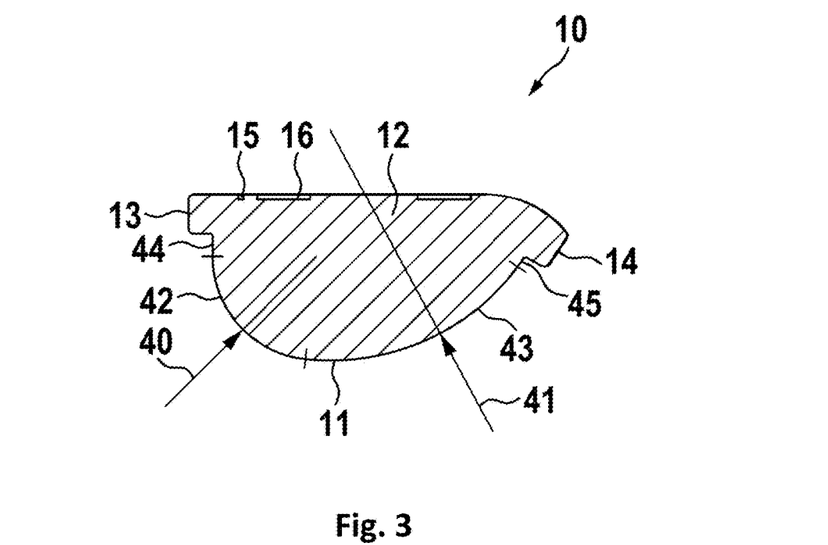
FIG. 3 shows a sectional cut of the first embodiment.

In FIG. 3, a sectional cut of the first embodiment is shown. This cut is, as indicated in the previous figure, is made along the cutting lines A-A. For better visibility, this figure has been enlarged versus the previous figures. The bottom surface 11 of the balancing weight has at least a first curved section 42 and a second curved section 43. These sections are marked in the figure by small perpendicular lines. The first curved section 42 has a first length and a first radius 40. The second curved section 43 has a second length and a second radius 41. The length of the radius indicating lines indicate the radius between the arrow and the end of the line. The center axis for each curved section therefore is at the end of the line. Preferably, the center axis for the first radius 40 goes through the balancing weight body, while it is preferred, that the center axis for the second radius 41 is outside of the balancing weight body. In this embodiment, there is a first straight section 44 between the first curved section 42 and the first extension 13, and a second straight section 45 between the second curved section 43 and the second extension 14. There may be a further straight section (not shown in this embodiment) between the first curved section 42 and the second curved section 43. The both curved sections will result in at least two contact points with the rim of a large variety of balancing weights, which results in a sufficient contact and a sufficient adhesive force to the rim if an adhesive tape is between the balancing weight and the rim. Due to the curves of the curved sections, the distance to the rim in case of any deviations of the form of the rim is slightly decreasing. Such a slightly decreasing distance may easily be absorbed by a self-adhesive tape between the balancing weight and the rim, thus resulting in a comparatively large section in which adhesive forces apply.

Figure 4:
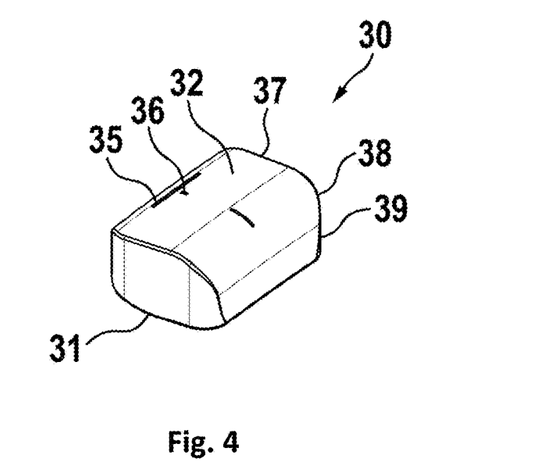
FIG. 4 shows a second embodiment, preferably for aluminum rims.

In FIG. 4, a second embodiment is shown which is preferably suited for aluminum rims. As known from the prior art, balancing weights previously could have been attached only to comparatively planar surfaces of aluminum rims. A balancing weight 30 according to this embodiment now may be attached to the outer edge of an aluminum rim, which significantly increases the flexibility and the possible range of application of balancing weights. Again, this balancing weight has a top surface 32 and a bottom surface 31. Again, there may be markings on the top surface, as described before. There may be a first line 35 approximately parallel to the circumference of the rim, and a second line 36 in radial direction, which may be directed toward the axis of the wheel. In this embodiment it is preferred, if the top surface is curved and preferably comprises of a first planar top surface section 37, a curved top surface section 38, and a second planar top surface section 39. It is preferred, if the first planar top surface section 37 and the second planar top surface section 39 are under an angle, preferably approximately under a right angle. The angle preferably may be in a range between 60 and 120 degrees, and most preferably is between 80 and 100 degrees. This results in an acceptable appearance of the balancing weight when mounted to the rim.

Figure 5:
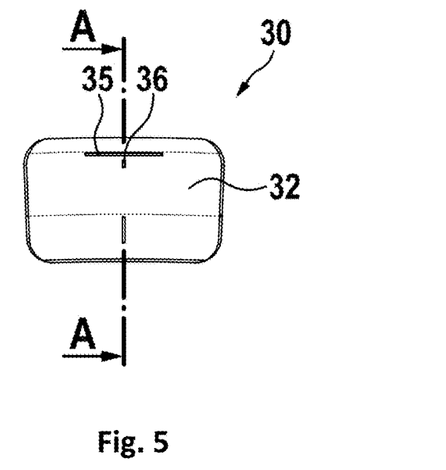
FIG. 5 shows the second embodiment in a top view.

In FIG. 5, the second embodiment is shown in a top view. Here a sectional cut A-A is indicated, which will be shown in detail in the next figure.

Figure 6:
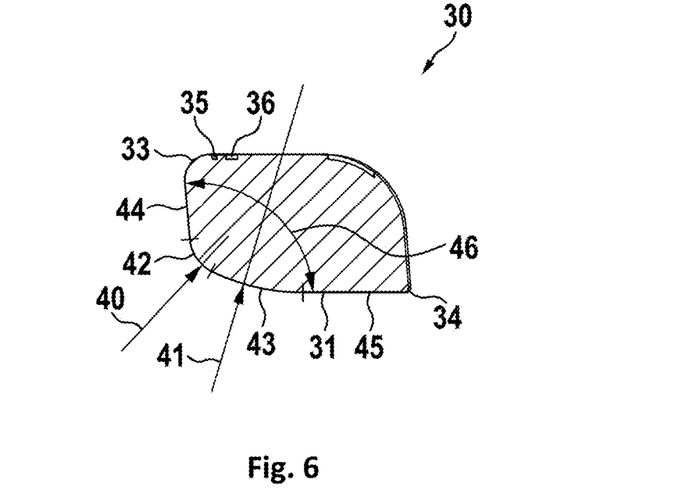
FIG. 6 shows a sectional cut of the second embodiment.

In FIG. 6, a sectional cut of the second embodiment is shown in an enlarged scale. This cut is as indicated in the previous along the cutting lines A-A. The bottom surface 11 of the balancing weight has at least one first curved section 42 and a second curved section 43. The first curved section 42 has a first length and a first radius 40. The second curved section 43 has a second length and a second radius 41. In this embodiment, there is a first straight section 44 between the first curved section and the first edge 33, and a second straight section 45 between the second curved section 43 and the second edge 34. Preferably the angle between these straight sections is 90 degrees. The angle may vary for less than ±30 degrees, preferably less than ±20 degrees and most preferably less than ±10 degrees. There may be a further straight section between the first curved section 42 and the second curved section 43 (not shown in this embodiment). The both curved sections will result in at least two contact points with the rim of a large variety of balancing weights, which results in a sufficient contact and a sufficient adhesive force to the rim. Due to the curves of the curved sections, the distance to the rim in case of any deviations of the form of the rim is slightly decreasing. Such a slightly decreasing distance may easily be absorbed by a self-adhesive tape between the balancing weight and the rim, thus resulting in a comparatively large section in which adhesive forces apply.

Figure 7:
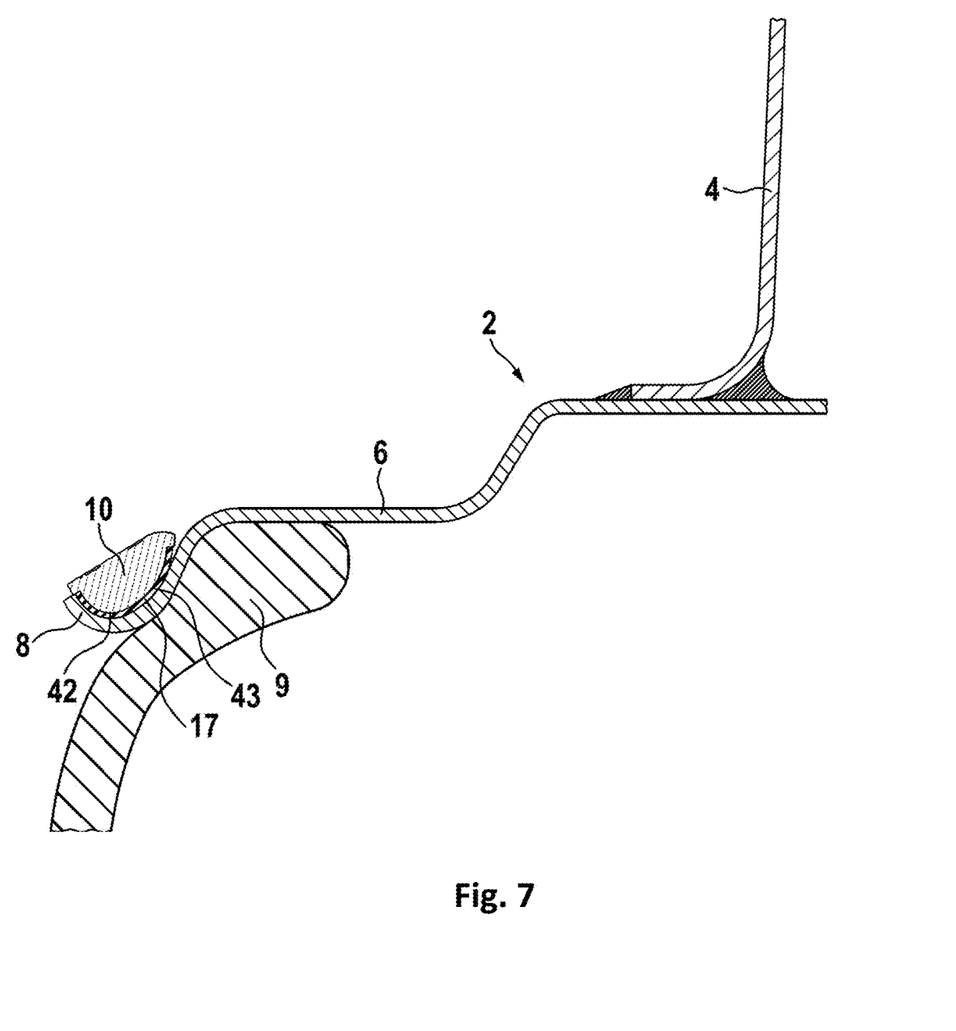
FIG. 7 shows a balancing weight of a first embodiment mounted to a rim.

In FIG. 7, a balancing weight 10 mounted to a steel rim 2 of a wheel is shown. A wheel rim 2 comprises at least a wheel disk 4 and a wheel band 6 ending in a wheel horn 8, as known from the art. A tire 9 is mounted to the wheel rim 2.

Figure 8:
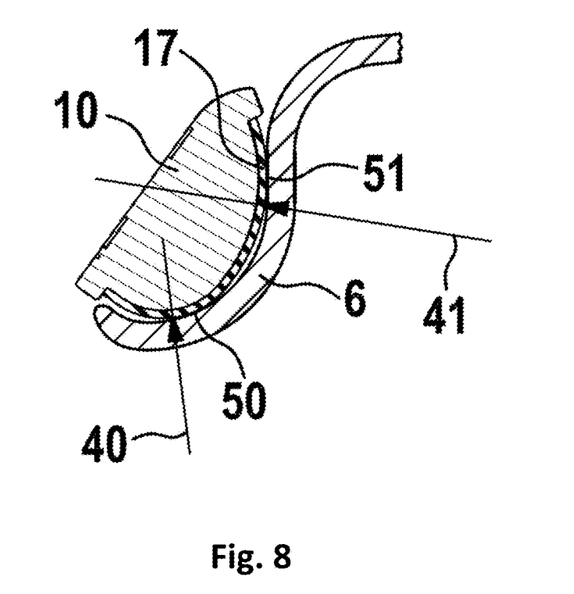
FIG. 8 shows the balancing weight on a slightly different rim.

In FIG. 8, an enlarged section of a balancing weight on a rim is shown. There is first contact area 50 between the balancing weight and the rim at the first curved section 42 of the balancing weight. Furthermore, there is a second contact area 51 between the second curved section 43 of the balancing weight and the rim. These two contact areas are at some distance to each other and are large enough to hold the balancing weight in a longtime durable position at the rim.

Figure 9:
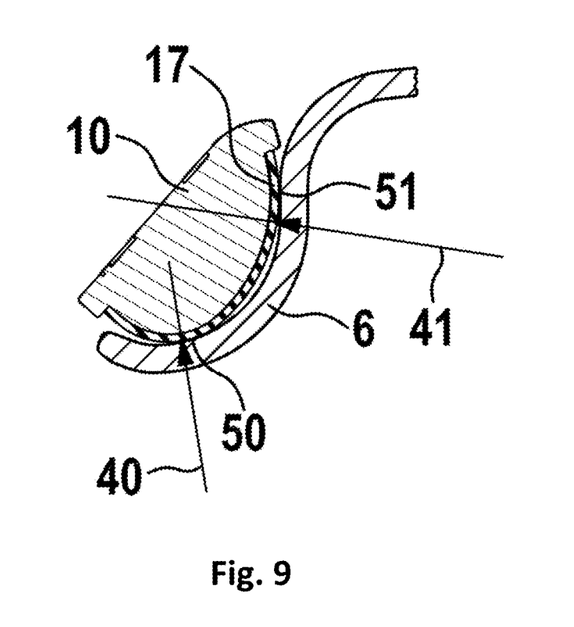
FIG. 9 shows a balancing weight attached to a further rim.

In FIG. 9, a balancing weight attached to a further rim is shown, having a slightly different shape compared to the previously shown rims. As it can be seen, there are again first a contact area 50 and a second contact area 51 with the rim, ensuring longtime attachment of the balancing weight to the rim. Here, the both contact areas are slightly more oriented outwards to the extensions.

Figure 10:
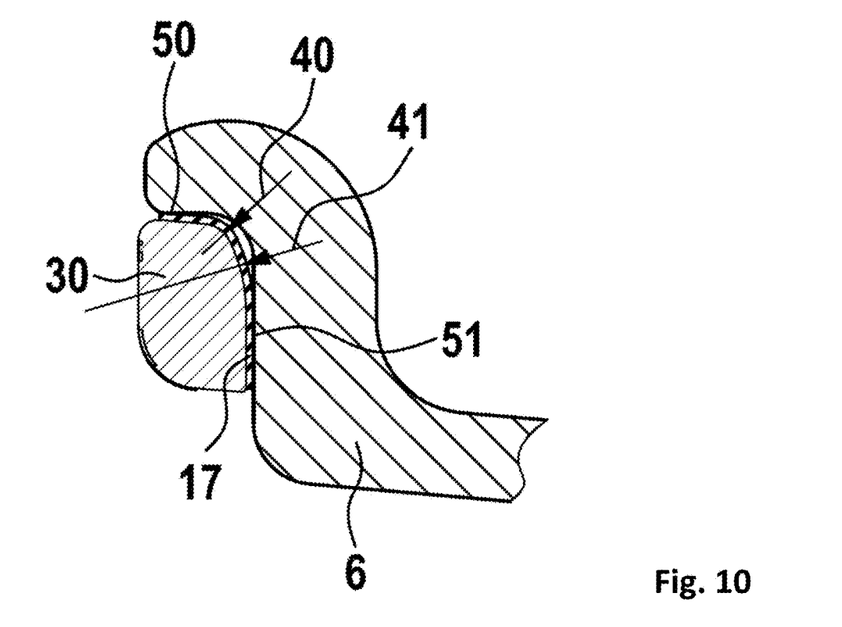
FIG. 10 shows a second embodiment of a balancing weight held to an aluminum rim.

In FIG. 10, a second embodiment of a balancing weight held to an aluminum rim 6 is shown. Again, there is a first a contact area 50, which is close to the first curved section, which may also be close to the straight section 44. A second contact area 51 is close to the second curved section. It may also be close or on the straight section 45.

Figure 11:
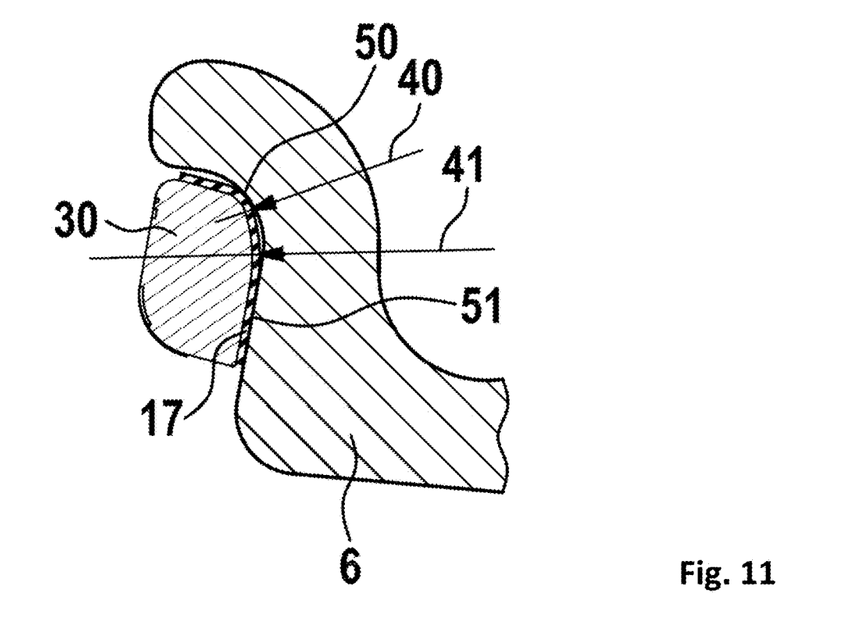
FIG. 11 shows the balancing weight on a slightly different rim.

In FIG. 11, the balancing weight is shown on a slightly different rim. Again, there is at least a first contact area 50 and a second contact area 51, as described above.

Figure 12:
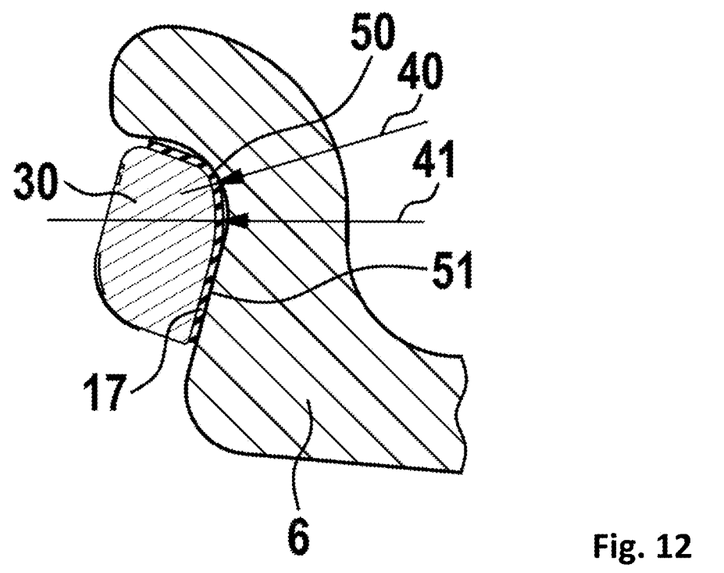
FIG. 12 shows a balancing weight attached to a further rim.

In FIG. 12, a balancing weight is attached to a further rim, having a different shape compared to the previously shown rims. As it can be seen, there are again first a contact area 50 and a second contact area 51 with the rim, ensuring longtime attachment of the balancing weight to the rim.

Figure 13:
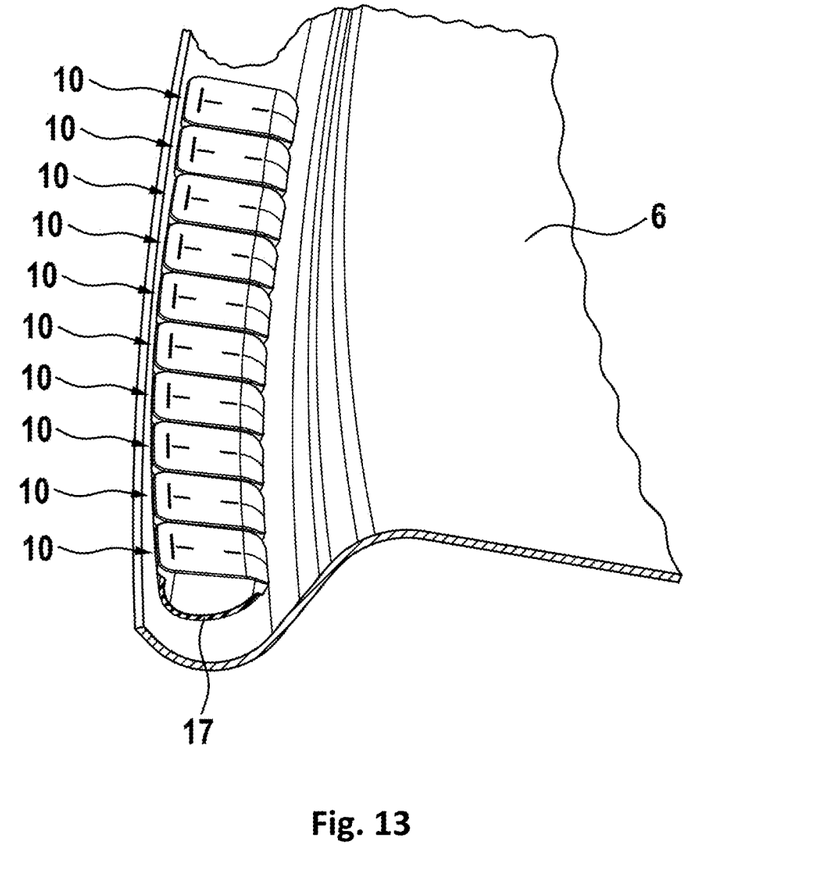
FIG. 13 shows a chain of balancing weights mounted to a rim.

In FIG. 13, a chain of balancing weights mounted to a rim is shown. For increasing the total mass of balancing weights attached to a rim, a plurality of balancing weights may be mounted. It is preferred if the plurality of balancing weights have a self-adhesive tape 17.

Figure 14:
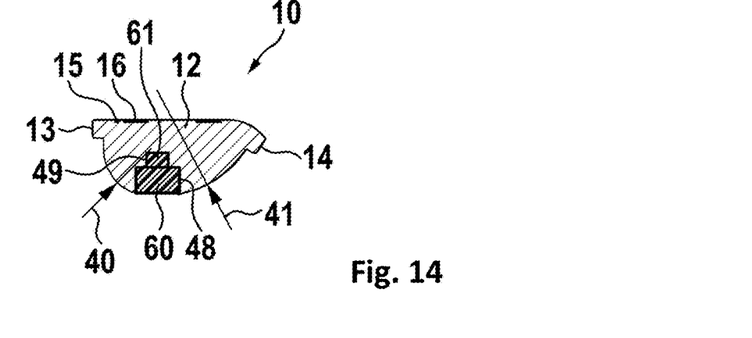
FIG. 14 shows a balancing weight of a first embodiment with a connecting means in a sectional view.

In FIG. 14 a balancing weight 10 of a first embodiment, preferably for steel rims, with a connecting means is shown in a sectional view. Preferably the balancing weight 10 has a cut-out or recess 48 for holding the connecting means 60. A cavity 49 may interface with a projection 61 of the connecting means 60 for improving anchoring of the connecting means within the balancing weight.

Figure 15:
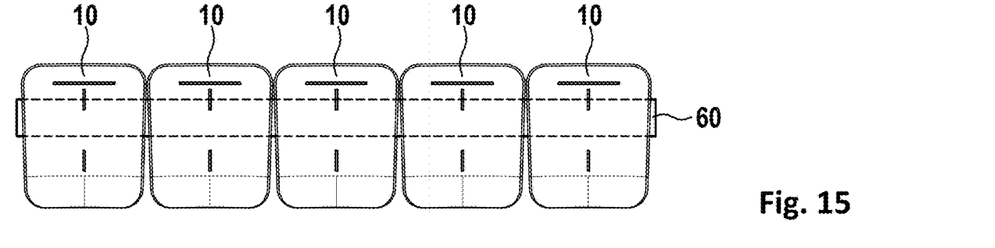
FIG. 15 shows a plurality of first connected balancing weights

FIG. 15 shows a plurality of first connected balancing weights 10. Such balancing weights may be connected to strings or chains of any desired length. They may be wound to a coil.

Figure 16:
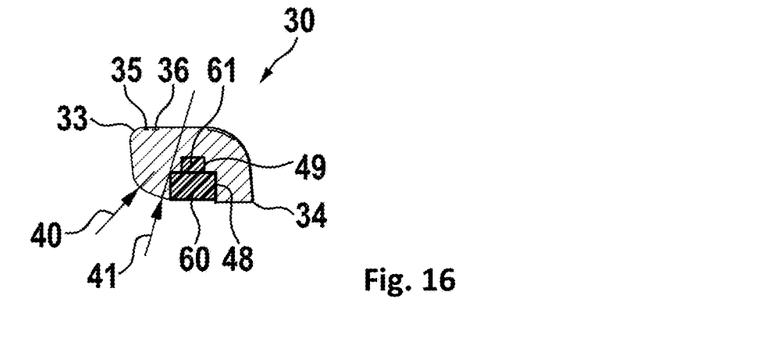
FIG. 16 shows a balancing weight of a second embodiment with a connecting means in a sectional view.

FIG. 16 shows a balancing weight 30 of a second embodiment, preferably for aluminum rims, with a connecting means in a sectional view. Preferably the balancing weight 30 has a cut-out or recess 48 for holding the connecting means 60.

Figure 17:
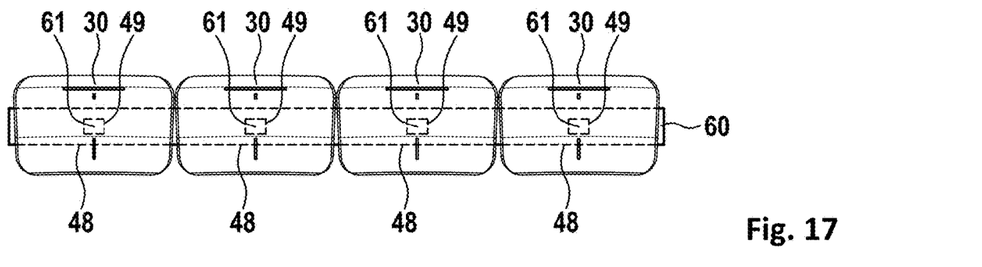
FIG. 17 shows a plurality of second connected balancing weights.

FIG. 17 shows a plurality of second connected balancing weights 30. Such balancing weights may be connected to strings or chains of any desired length. They may be wound to a coil.

Figure 18:
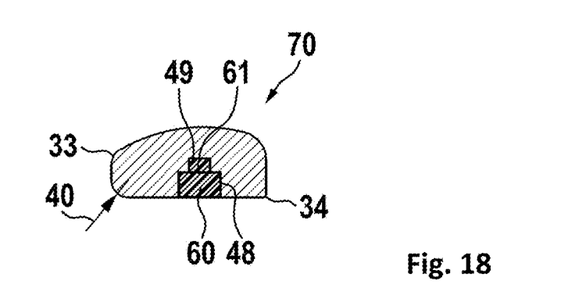
FIG. 18 shows a balancing weight of a third embodiment.

FIG. 18 shows a balancing weight 70 of a third embodiment, preferably for aluminum rims, with a connecting means in a sectional view. Here, the second radius is extremely large or it is even missing, so that there is no second curved section, resulting in a plane bottom surface. Preferably the balancing weight 30 has a cut-out or recess 48 for holding the connecting means 60.

Figure 19:
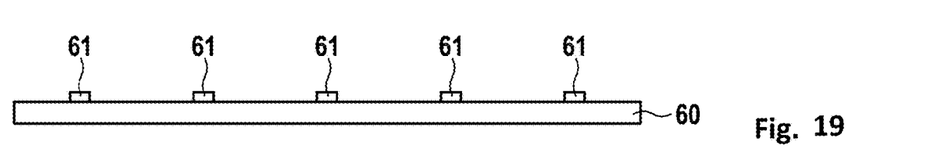
FIG. 19 shows a connecting means.

FIG. 19 shows a connecting means 60. The connecting means 60 may have at least one projection 61 interfacing with a cavity 49 in a balancing weight to improve anchoring of the connecting means within the balancing weight.

Figure 20:
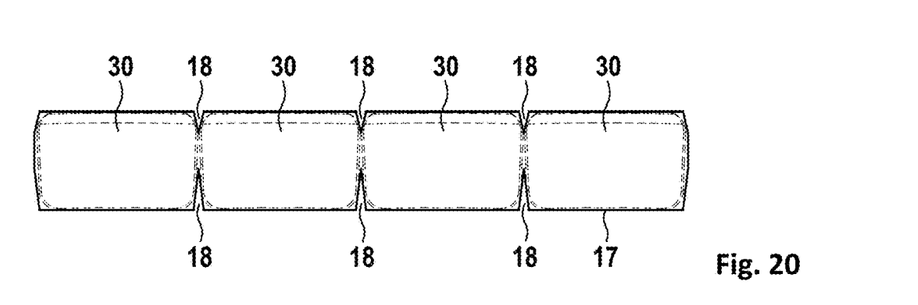
FIG. 20 shows a chain of balancing weights from the bottom side.

FIG. 20 shows a chain of balancing weights from the bottom side. Here, preferably, gaps or cutouts 18 are provided in the self-adhesive tape, which allow easier bending to adapt to a radius of a rim.

Figure 21:
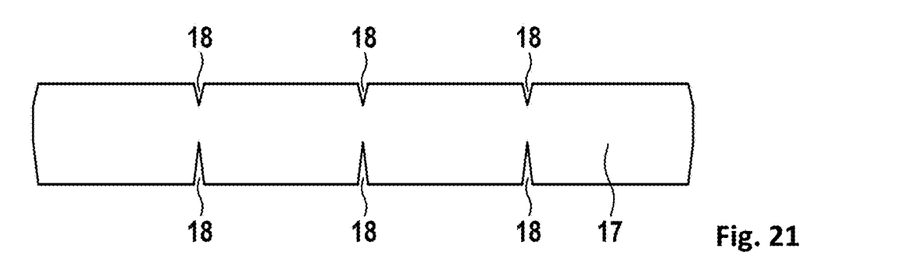
FIG. 21 shows a self-adhesive tape with gaps or cutouts.

FIG. 21 shows a preferred embodiment of a self-adhesive tape 17. Here, gaps or cutouts 18 are provided, which allow easier bending to adapt to a radius of a rim.

Figure 22:
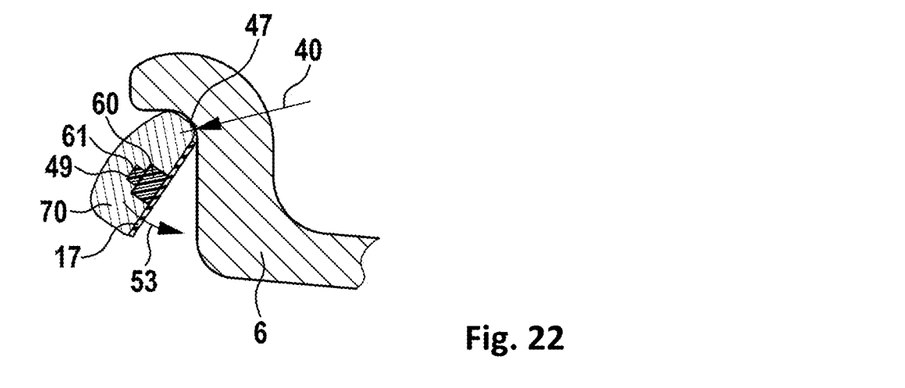
FIG. 22 shows the first step of attaching a balancing weight.

FIG. 22 shows a method of attaching a balancing weight to the rim of a wheel. In a first step, the balancing weight is applied under an angle, which may be between 20 and 90 degrees to an edge of the rim. In the next step, the balancing weight is tilted or moved in a direction 53 as shown by the arrow, such that its bottom surface contacts the rim and the self-adhesive tape adheres to the rim.

Figure 23:
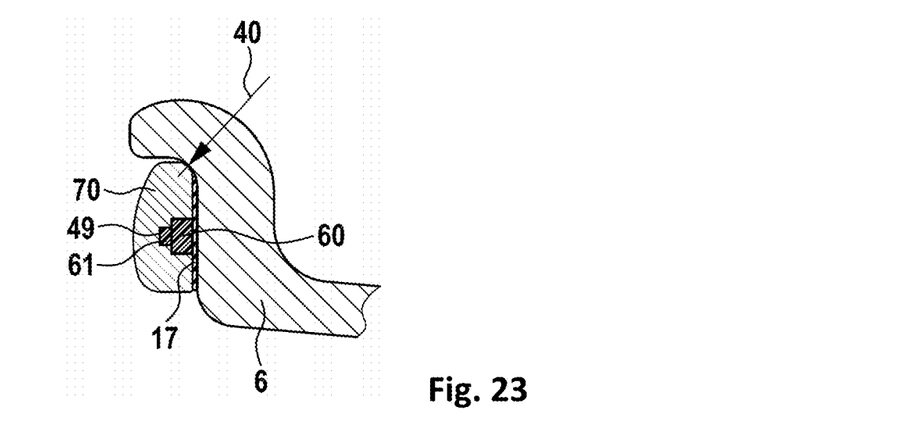
FIG. 23 shows the last step of attaching a balancing weight.

FIG. 23 shows the final step of attaching a balancing weight to the rim of a wheel. Here, the balancing weigh is sticking by means of the self-adhesive tape to the rim.

Figure 24:
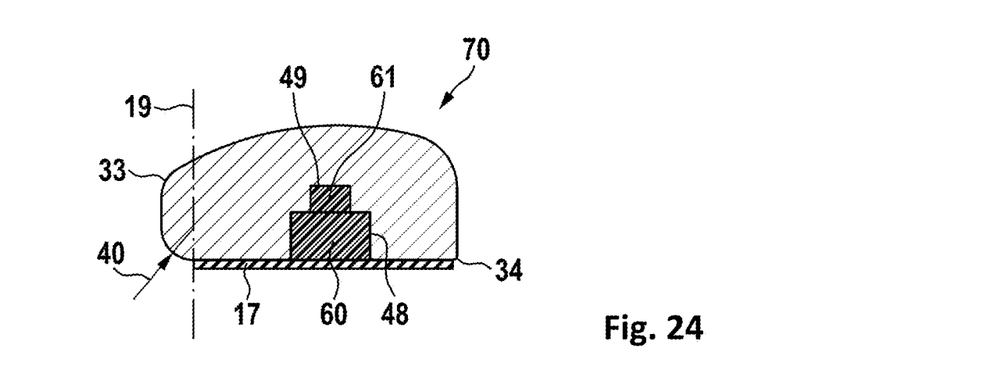
FIG. 24 shows a further embodiment with a shortened self-adhesive tape.

FIG. 24 shows a further embodiment with a shortened self-adhesive tape 17. This embodiment may be combined with all balancing weights disclosed herein. For simplifying attachment steps as shown before, there is no self-adhesive tape at the first radius 40. Preferably, the tape ends at a limit line 19 going through the center of the arc with radius 40 under a right angle to the bottom surface of the balancing weight.

Figure 25:
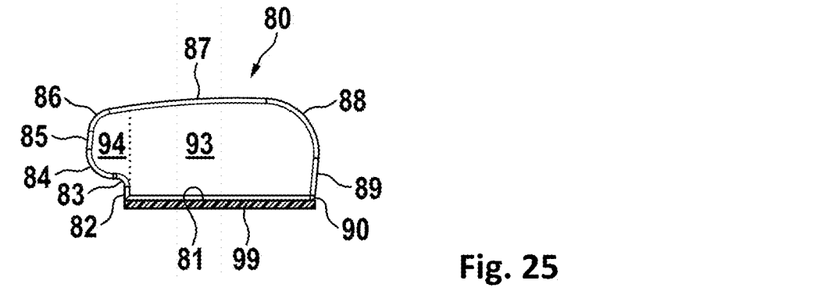
FIG. 25 shows a side view of another embodiment of a balancing weight.

FIG. 25 shows a side view of another embodiment of a balancing weight. The balancing weight 80 has a main body 93 and an extension 94 thereto. Preferably, the main body is roughly rectangular shaped and has a bottom surface 81 which is also the attachment surface further being an approximately plane surface. At the bottom surface 81, there is an adhesive tape 99. The bottom surface has a first bottom edge 82 to the front side of the balancing weight and a second bottom edge 90 to the rear side of the balancing weight. The extension 94 is above the bottom surface and preferably above the first bottom edge 82 and may be defined by a concave shape 83 and two convex shapes 84, 86. There may even be a front plane 85 between the two convex shapes. There is no adhesive tape at the extension. Preferably, there is a smooth transition to the top 87 of the balancing weight which preferably has a convex shape 88 at the rear side to a rear plane 89 which further extends from the second bottom edge 90.

Figure 26:
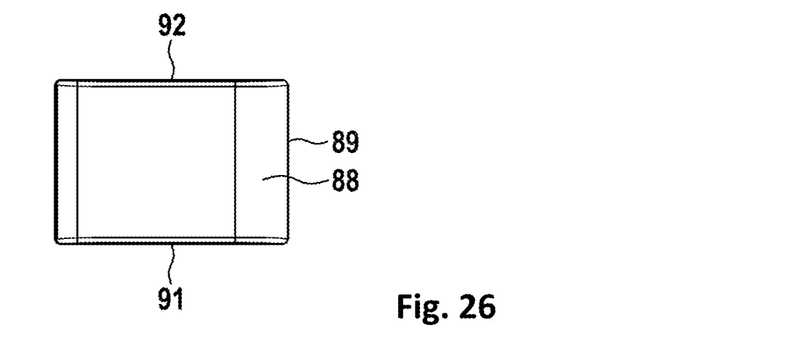
FIG. 26 shows a top view of the same balancing weight.

In FIG. 26 a top view of the same balancing weight is shown. The balancing weight has a left side 91 and a right side 92.

Figure 27:
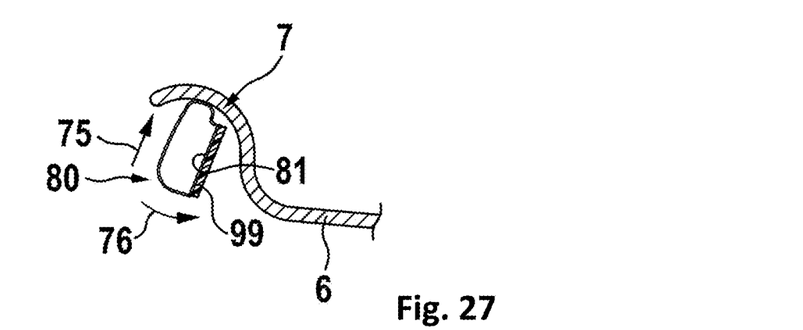
FIG. 27 shows the first steps of applying a balancing weight to a rim.

In FIG. 27 the first steps of applying a balancing weight 80 to a rim 7, preferably a steel rim is shown. First, the balancing weight is moved as shown by direction arrows 75 towards the rim 6 and preferably towards a rim edge inner radius 7, such as that the extension of the balancing weight contacts the rim, but the adhesive tape does not contact from. Now the balancing weight is still movable and adjustable without sticking to the rim. After the final position has been identified, the balancing weight may be tilted towards the rim as shown by direction arrow 76.

Figure 28:
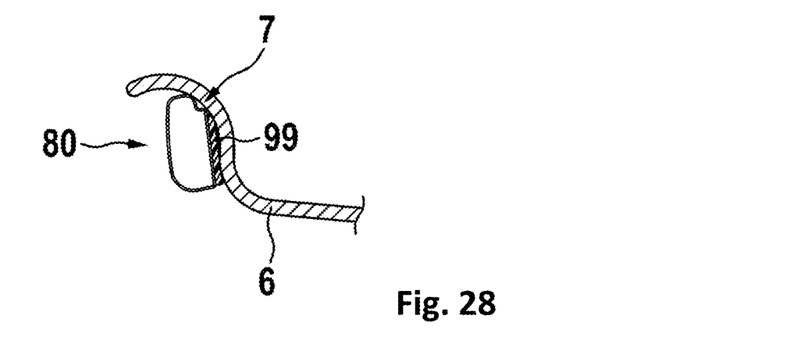
FIG. 28 shows a balancing weight in a state attached to the rim.

In FIG. 28 a balancing weight 80 is shown in a state attached to the rim. After the previous steps, there may some pressure be applied to the balancing weight, for fixing it to the rim.

It will be appreciated to those skilled in the art having the benefit of this disclosure that this invention is believed to provide self-adhesive balancing weights for vehicle wheels. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 2 wheel rim
4 wheel disk
6 wheel band
7 rim edge inner radius
8 wheel horn
9 tire
10 balancing weight
11 bottom surface
12 top surface
13 first extension
14 second extension
15 first line
16 second line
17 self-adhesive tape
18 cutout
19 limit line of tape
30 balancing weight
31 bottom surface
32 top surface
33 first edge
34 second edge
35 first line
36 second line
37 first planar top surface section
38 curved top surface section
39 second planar top surface section
40 first radius
41 second radius
42 first curved section
43 second curved section
44 first straight section
45 second straight section
46 angle
47 tape-less section
48 groove
49 cavity
50 first contact area
51 second contact area
53 direction of insertion
60 connecting means
70 balancing weight
75 direction of shifting
76 direction of tilting
80 balancing weight
81 bottom surface
82 first bottom edge
83 first concave shape
84 first convex shape
85 front plane
86 second convex shape
87 top
88 third convex shape
89 rear plane
90 second bottom edge
91 left side
92 right side
93 main body
94 extension
99 adhesive tape

The invention claimed is:

1. Self-adhesive balancing weight for a vehicle wheel, the balancing weight comprising:
 a main body and an extension, wherein:
  the main body comprises a planar surface with an adhesive tape and a top surface opposite the planar surface,
  the extension comprises a first convex section that laterally extends above the planar surface and outward of the planar surface along a plane that is spaced apart from the plane of the planar surface from the main body,
  the extension has no adhesive tape,
  an end of the main body opposite the extension that includes a rear plane that extends from an edge of the planar surface, and a second convex section that transitions the top surface to the rear plane, and
  a concave shaped section is between the first convex section of the extension and the planar surface; and
 wherein the self-adhesive balancing weight is configured such that the adhesive tape is the sole means for attaching the self-adhesive balancing weight to the vehicle wheel.

2. Self-adhesive balancing weight according to claim 1, further comprising:
 a connecting means flexibly connecting a plurality of the balancing weights.

3. Chain of balancing weights comprising a plurality of balancing weights according to claim 1, wherein
 the balancing weights are interconnected by the self-adhesive tape and/or by a connecting means.

4. Method for attaching a balancing weight according to claim 1, the method comprising the steps of:
 applying an end of the extension of the balancing weight to a front surface of a rim; and
 tilting or moving the balancing weight such that the planar surface is coupled to the front surface of the rim via the adhesive.

5. Self-adhesive balancing weight according to claim 1, wherein
 the balancing weight is configured to be coupled to a surface of a rim such that the extension does not extend to an outer diameter of the rim.

6. Self-adhesive balancing weight according to claim 1, wherein the edge comprises a first bottom edge of the planar surface, and further comprising:
 a second bottom edge of the planar surface opposite the first bottom edge, the concave shaped section begins at the first bottom edge and is positioned between the second bottom edge and the first convex section.

7. Self-adhesive balancing weight according to claim 6, wherein the first convex section comprises:
 a first curved portion;
 a second curved portion; and a planar portion positioned between the first curved portion and the second curved portion.

8. Chain of balancing weights according to claim 3, wherein:
each balancing weight includes a right side and left side,
the balancing weights, when coupled to a rim, are positioned such that each of the extensions extend in the same direction relative to the self-adhesive tape and/or the connecting means, and are positioned such that a left side of a first balancing weight is positioned adjacent to a right side of a second balancing weight.

9. Self-adhesive balancing weight for a vehicle wheel, the balancing weight comprising:
a main body and an extension, wherein:
the main body comprises a planar surface with an adhesive tape and a top surface opposite the planar surface,
the extension comprises a first convex section that laterally extends above the planar surface and outward of the planar surface along a plane that is spaced apart from the plane of the planar surface from the main body,
the first convex section comprises:
a first curved portion;
a second curved portion; and
a planar portion positioned between the first curved portion and the second curved portion,
the extension has no adhesive tape,
an end of the main body opposite the extension that includes a rear plane that extends from an edge of the planar surface, and a second convex section that transitions the top surface to the rear plane, and
a concave shaped section is between the first convex section of the extension and the planar surface.

10. The self-adhesive balancing weight according to claim 9, wherein the first curved portion is positioned between the planar portion and the concave shaped section.

11. The self-adhesive balancing weight according to claim 10, wherein the concave shaped section is positioned between the first curved portion and the adhesive tape to establish a separation between the first curved portion and the adhesive tape such that, during installation of the self-adhesive balancing weight to a curved surface of the vehicle wheel, the first curved portion and the adhesive tape are separated to enable concurrent contact of each of the first curved portion and the adhesive tape with the curved surface of the vehicle wheel.

12. The self-adhesive balancing weight according to claim 9, wherein the self-adhesive balancing weight is configured such that, during installation of the self-adhesive balancing weight to a curved surface of the vehicle wheel for use of the self-adhesive balancing weight as a balancing weight of the vehicle wheel, the first curved portion and the adhesive tape are separated apart from each other to enable concurrent contact of each of the first curved portion and the adhesive tape with the curved surface of the vehicle wheel.

13. The self-adhesive balancing weight according to claim 9, wherein the edge comprises a first bottom edge of the planar surface, and further comprising a second bottom edge of the planar surface opposite the first bottom edge, the concave shaped section begins at the first bottom edge and is positioned between the second bottom edge and the first convex section.

14. Chain of balancing weights comprising a plurality of balancing weights according to claim 9, wherein
the balancing weights are interconnected by the self-adhesive tape and/or by a connecting means.

15. Chain of balancing weights according to claim 9, wherein:
each balancing weight includes a right side and left side,
the balancing weights, when coupled to a rim, are positioned such that each of the extensions extend in the same direction relative to the self-adhesive tape and/or a connecting means, and are positioned such that a left side of a first balancing weight is positioned adjacent to a right side of a second balancing weight.

16. Chain of balancing weights comprising:
a plurality of balancing weights according to claim 9; and
a connecting means flexibly connecting a plurality of the balancing weights.

* * * * *